Nov. 26, 1963 C. A. MONTAGUE, JR 3,111,721

TELEPHONE BOOTH CONSTRUCTION

Filed Aug. 10, 1962

INVENTOR.
CHARLES A. MONTAGUE, JR

BY John R. Walker, III
Attorney 3,111,721
Patented Nov. 26, 1963

3,111,721

TELEPHONE BOOTH CONSTRUCTION

Charles A. Montague, Jr., 5269 Pecan Grove Lane, Memphis, Tenn.

Filed Aug. 10, 1962, Ser. No. 216,201
4 Claims. (Cl. 20—3.5)

This invention relates to an improved telephone booth construction.

The usual telephone booth is one which is box-like in construction and usually provided with a door. In this previous type of telephone booth, there were certain disadvantages, as for example, if the booth did not have a door or if the door were left open, there was no way to prevent noise, rain or the like that happened to be coming from the particular direction that the opening was facing, from entering the booth. On the other hand, if the door were closed to shut out such noises, rain or the like, the booth would become hot and the air close.

The present invention is directed towards overcoming the above mentioned and other disadvantages in previous types of telephone booths.

Thus, one of the objects of the present invention is to provide a telephone booth that is well ventilated and cool.

A further object is to provide such a telephone booth that can be faced towards the noise source and thereby reduce the noise interference.

A further object is to provide such a telephone booth that insures weather protection of the user and equipment.

A further object is to provide such a telephone booth that gives sound privacy without complete physical privacy to promote cleanliness and sanitation.

A further object is to provide a telephone booth construction of low cost.

A further object is to provide such a telephone booth construction that is pleasing in appearance and compatible with modern design.

A further object is to provide such a telephone booth construction that is safe.

A further object is to provide such a telephone booth construction which has better sound-proofing qualities.

A further object is to provide a telephone booth construction comprising an upstanding telephone booth housing that is rotatably mounted for rotation about a vertical axis and which is so constructed that when the wind blows against the booth it will rotate towards the wind, with the opening in the booth being remote from the wind.

A further object is generally to improve the design and construction of telephone booths.

The means by which the foregoing and other objects of the present invention are accomplished and the manner of their accomplishment will be readily understood from the following specification upon reference to the accompanying drawings, in which.

Figures 1, 2, 3, 4, 5, 6, 7:
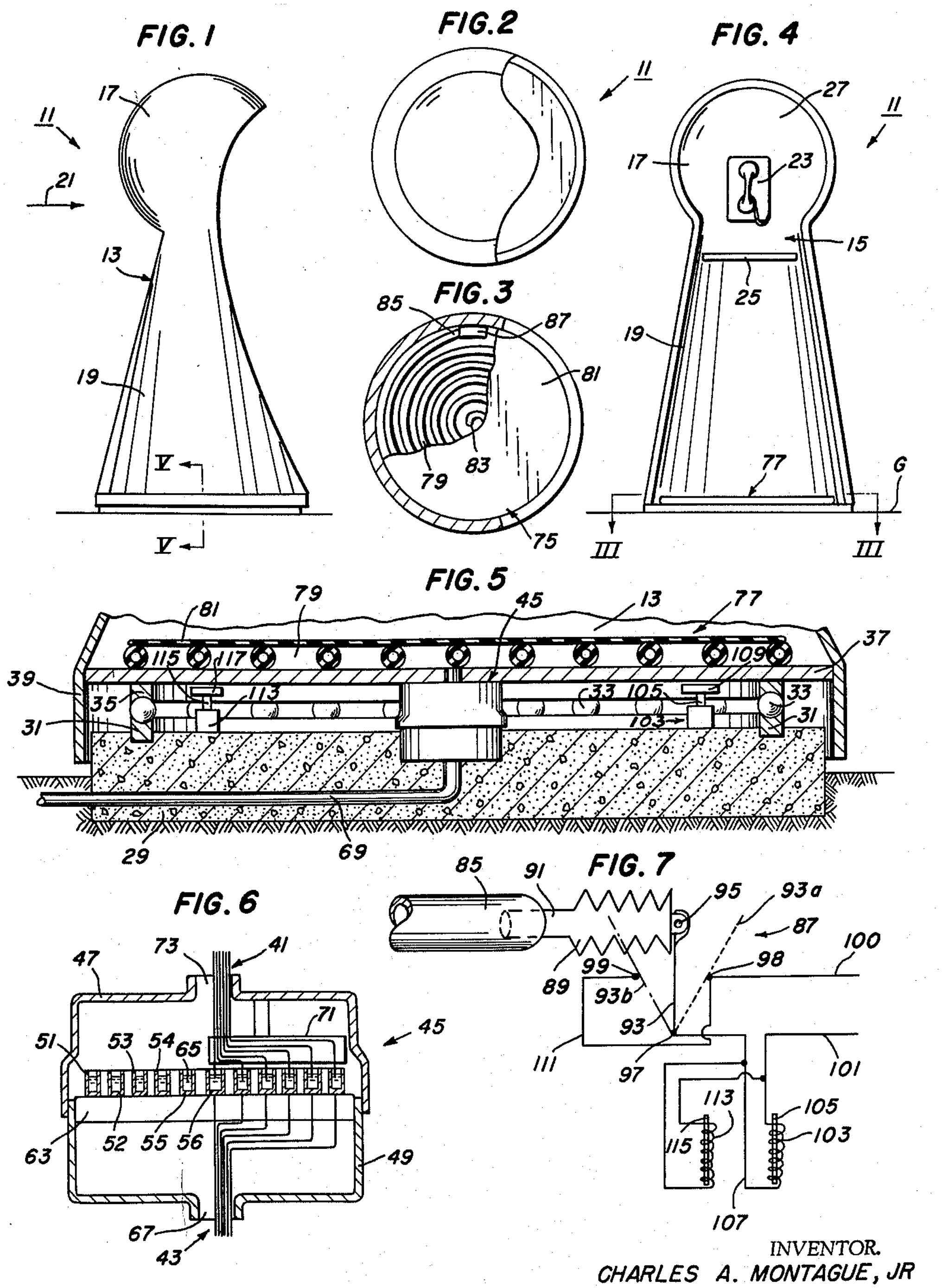
FIG. 1 is a side elevational view of the telephone booth of the present invention.
FIG. 2 is a top view thereof.
FIG. 3 is a sectional view taken as on the line III—III of FIG. 4.
FIG. 4 is an elevational view similar to FIG. 1 but with the telephone booth housing having been rotated 90 degrees.
FIG. 5 is an enlarged fragmentary sectional view taken as on the line V—V of FIG. 1.
FIG. 6 is a somewhat schematic sectional view of the rotary joint taken as on a vertical plane through the middle of the device.
FIG. 7 is a diagrammatic view showing a portion of the means for holding the booth against rotation.

Referring now to the drawings in which the various parts are indicated by numerals, the telephone booth 11 of the present invention comprises an upstanding telephone booth housing 13 having an opening 15 on one side thereof leading to the interior thereof. The upper portion 17 of housing 13 is preferably in the shape of a portion of a hollow sphere and the lower portion 19 of the housing is preferably in the shape of a portion of a hollow frustrum of a cone which is integrally joined adjacent the upper end thereof to the lower end of upper portion 17. Housing 13 is rotatably mounted for rotation about a vertical axis by means later to be described. Housing 13 is so constructed that it will offer less resistance to wind when the opening 15 is remote from the wind, so that the housing will always rotate until it faces the wind and opening 15 is remote from the wind. In other words, assuming that the wind is blowing in the direction indicated by the arrow at 21 in FIG. 1, the housing 13 will rotate until it is in the position shown in FIG. 1. Stated another way, housing 13 acts in a manner similar to an anemoscope. It will be understood that other shapes of housing 13, as for example, a triangular shape, may be used without departing from the spirit and scope of the present invention, but the shape is preferably so that the housing will turn into the wind as heretofore described.

In the interior of telephone booth 11 the usual telephone 23 is provided and preferably a shelf 25 is provided. It will be understood that this is a type of booth in which a person stands, and the upper portion 17 covers the upper part of the body with the lower portion 19 covering the lower portion of the body. In addition, the interior of housing 13 is preferably sound-proofed, as by means of a suitable sound-suppressing paint 27, or by other means as foam, fiber pad, etc. Additionally, it should be noted that housing 13 is constructed of any suitable material, as plastic, metal, composition (fibrous) or the like. Also, it should be pointed out that although the present invention has been illustrated with respect to a telephone booth of the type which is adapted for a person to stand therein, the present invention can be adapted to the automobile drive-up type wherein the person using the phone sits in his automobile.

Telephone booth 11 includes a circular base 29 which is supported by a supporting surface as the ground G and is preferably formed of concrete or the like. Circular base 29 is disposed horizontally with its axis extending vertically. An annular lower ball bearing race 31, which is concentric with base 29 and embedded therein, supports a plurality of ball bearings 33 which, in turn, support an annular upper ball bearing race 35 that is similar to lower race 31 and is attached to the circular bottom 37 of housing 13. Bottom 37, in turn, is fixedly attached around the periphery thereof by suitable means to the lower part of lower portion 19. An annular skirt 39 is fixedly attached to bottom 37 adjacent the periphery thereof and depends downwardly in overlapping relationship relative to base 29, as best seen in FIG. 5.

A rotary joint, which is best seen in FIGS. 5 and 6, is provided between the wires 41 that are fixed relative to the housing 13 and the wires 43 which are fixed relative to the base 29. It will be understood that these wires 41, 43 are necessary for the various telephone connections and for lights, etc. in the telephone booth 11. The rotary joint 45 includes an upper half 47 attached to circular bottom 37 and rotatable therewith, and includes a lower half 49 which is stationary and preferably embedded in base 29, as best seen in FIG. 5. A plurality of open containers 51, 52, 53, 54, 55 and 56 are supported by suitable means, as insulated support 63, in lower half 49. Each of the containers 51—56 open upwardly and contain a quantity of electricity conducting liquid, as for example, mercury shown as at 65. The center container 56 is circular and the other containers are annular and concentric with center container 56, with the containers 51—55 decreasing in diameter from outer container 51 to container 55. Wires 43 are respectively attached to containers 51—56 and extend outwardly through an opening 67 in lower half 49 and then out through a pipe 69 embedded in base 29 and thence on out to the connection with the telephone wires and power source. Wires 41 respectively have the ends thereof extending down into containers 51–56 and are supported in upper half 47 by a suitable insulated support, as support 71, so that as housing 13 rotates carrying with it upper half 47 and support 71, the wires are carried in circular paths and remain in contact with the mercury in the respective containers 51—56 whereby electrical contact is continuously made between wires 41 and 43. The wires 41 lead upwardly through the opening 73 in upper half 47 and thence to the telephone 23 and light or other appliances, not shown.

A pressure sensitive device 75 is provided on top of the bottom 37 of housing 13 so that when a person steps into the booth on top of the pressure sensitive device, it will be actuated for a purpose later to be described. Pressure sensitive device 75 preferably comprises a pad 77 which includes a flexible hose 79, preferably formed of rubber or the like, and a flexible circular cover 81, preferably formed of rubber or the like, disposed over the hose. The inner end 83 of hose 79 is closed off and the hose is arranged in a spiral which spirals outwardly from the inner end 83 located adjacent the center of bottom 37 and terminates at its outer end 85 which is attached to a suitable pressure switch 87 that is actuated by pressure on pad 77. Pressure switch 87 is a part of pressure sensitive device 75 and includes a bellows 89 in communication with a copper tube 91, which tube is inserted in the outer end 85 of hose 79 whereby the hose with the bellows and tube form a closed system, which is filled with compressed air so that the system is under pressure. Pressure switch 87 includes electrical switch 93 which is attached adjacent one end as at 95 to the outer end of bellows 89 and is pivotable about the point 97. Switch 93 is in a normal intermediate open position, as shown in solid line in FIG. 7, and when bellows 89 is expanded by pressure on pad 77, the switch moves to the dotted line position shown as at 93*a* to make contact with contact 98 and close the switch for a purpose later to be described. Also, if there is an accidental loss of air pressure in the system, there is a safety feature built into the device so that the switch 93 will also close and move to the position shown in broken lines at 93*b* in engagement with contact 99 due to the deflation of bellows 89. In other words, the condition of the bellows 89, shown in solid lines in FIG. 7, is a partially expanded condition due to the compressed air in the system, but that without any compressed air the bellows will contract to a position to the left of that shown in solid lines in FIG. 7 to the position shown at 93*b*. In FIG. 7, the numerals 100 and 101 represent the conductors from the power source, and it will be seen that conductor 100 is connected to contact 98 and conductor 101 is connected to the coil of a solenoid 103, which solenoid also includes a plunger 105. Another conductor 107 leads from solenoid 103 to switch 93 so that when the switch is moved into the position shown at 93*a*, current passes through the solenoid and the plunger 105 is moved upwardly. The solenoid 103 is mounted beneath bottom 37, as best seen in FIG. 5, so that when the plunger 105 moves upwardly as above described, a friction plate 109, which is attached to the upper end of plunger 105, contacts the lower surface of bottom 37 to hold the housing 13 against rotation. It will be understood that normally the friction plate 109 is spaced from bottom 37 so that the housing 13 is free to rotate, except when current flows through the solenoid 103 as above described. Also, a conductor 111 connects contact 98 with contact 99 so that when the switch 93 is in the position at 93*b*, current will also flow through the solenoid 103 to cause the same action of friction plate 109 as above described. In addition, a second solenoid 113 is connected in parallel with solenoid 103, as shown in FIG. 7, so that it also is actuated at the same time as solenoid 103. Solenoid 113 is preferably located 180 degrees from solenoid 103, as related to bottom 37. Also, solenoid 113 is similar to solenoid 103 and includes a plunger 115 having a friction plate 117 attached thereto.

From the foregoing description it will be understood that, with the telephone booth 11 empty, housnig 13 will remain faced towards the wind and will rotate to the new position when the wind shifts. Then, when a person steps inside of booth 11 to use telephone 23, it will be understood that the person's weight on pressure sensitive device 75 will cause housing 13 to remain stationary at the position it was in when the person stepped inside of the booth. During a rain, the above described position of housing 13 is the optimum one since the rain will come from the direction the wind blows and the housing with the opening 15 remote from the rain will offer the most protection. It will be understood that the interior of the booth will be protected from the weather when the booth is empty. On occasions, it may be advantageous to rotate the booth to other positions, which can be done manually by the person before he steps into the booth. For example, if a noise source is coming from a particular direction that is not the same direction from which the wind is blowing, it will be advantageous to turn the housing towards the noise source and thereby block the sound from the person using the telephone. Thus, it will be seen that the booth 11 of the present invention offers many advantages over previous types of booths, such as, for example, the advantage of sound privacy without complete physical privacy to promote cleanliness and sanitation. Also, the booth 11 of the present invention is pleasing in appearance, is economical to manufacture, and is more comfortable to the user.

Although the invention has been described and illustrated with respect to a preferred embodiment thereof, it is to be understood that it is not to be so limied since changes and modifications may be made therein which are within the full intended scope of this invention as hereinafter claimed.

I claim:

1. A telephone booth construction comprising a base, an upstanding housing, means rotatably mounting said housing on said base for rotation about a vertical axis, said housing having an opening on one side and being less resistant to the wind on the other portions thereof whereby when the wind blows against said housing it will rotate towards the wind with the opening being remote from the wind, pressure sensitive means in said housing in a position to be stepped on when a person enters said housing, and means responsive to said pressure sensitive means for holding said housing against rotation when a person steps in said housing.

2. A telephone booth construction comprising a base, a housing including a bottom, means interposed between said bottom and said base for rotatably mounting said housing on said base for rotation about a vertical axis, said housing having an opening on one side and being less resistant to the wind on the other portions thereof whereby when the wind blows against said housing it will rotate towards the wind with said opening being remote from the wind, a pad disposed on the top of said bottom in position to be stepped on when a person enters said housing, said pad including a hose closed off adjacent one end thereof, a pressure sensitive switch means at the opposite end of said hose from the closed off end thereof, said pressure sensitive switch and said hose providing a closed system under fluid pressure, said pressure sensitive switch being actuated when a person steps on said pad and when there is a loss of fluid pressure in said closed system, and means responsive to actuation of said pressure sensitive switch for holding said housing against rotation.

3. A telephone booth construction comprising a horizontally disposed circular base, a housing including a hollow substantially spherical upper portion, a hollow substantially frusto-conical lower portion integrally attached to said upper portion adjacent the lower end of said upper portion, and a circular bottom fixedly attached to said lower portion adjacent the lower end thereof, means attached to said bottom for rotatably mounting said housing on said base for rotation about a vertical axis, said housing having an opening on one side and being less resistant to the wind on the other portions thereof whereby when the wind blows against said housing it will rotate towards the wind with said opening being remote from the wind, a pad disposed on the top of said circular bottom in position to be stepped on when a person enters said housing, said pad including a hose closed off adjacent one end thereof, a pressure sensitive switch means at the opposite end of said hose from the closed off end thereof, said pressure sensitive switch and said hose providing a closed system under fluid pressure, at least one solenoid including a plunger, a friction plate attached to said plunger and mounted beneath said bottom in position to frictionally engage said bottom when said solenoid is actuated, circuit means coupling said pressure sensitive switch and said solenoid for causing actuation of said solenoid upon closure of said pressure sensitive switch, said pressure sensitive switch being normally open and being actuated to a closed position responsive to a person stepping on said pad and responsive to loss of fluid pressure in said closed system, whereby said friction plate engages said bottom and holds said housing against rotation when a person steps on said pad and when there is a loss of fluid pressure in said closed system.

4. A telephone booth construction comprising a horizontally disposed circular base, an annular lower ball bearing race concentric with said base and partially embedded therein, a plurality of ball bearings supported on said lower ball bearing race; a housing including a hollow substantially spherical upper portion, a hollow substantially frusto-conical lower portion integrally attached to said upper portion adjacent the lower end of said upper portion, and a circular bottom fixedly attached to said lower portion adjacent the lower end thereof; an annular upper ball bearing race similar to said lower ball bearing race and inverted relative thereto, said upper ball bearing race being fixedly attached to said circular bottom on the lower surface thereof, said upper ball bearing race being supported on said ball bearings whereby said housing is adapted to rotate, said housing having an opening on one side and being less resistant to the wind on the other portions thereof whereby when the wind blows against said housing it will rotate towards the wind with said opening being remote from the wind, a pad disposed on the top of said circular bottom in position to be stepped on when a person enters said housing, said pad including a hose closed off adjacent one end thereof, a pressure sensitive switch means at the opposite end of said hose from the closed off end thereof, said pressure sensitive switch and said hose providing a closed system under fluid pressure, at least one solenoid including a plunger, a friction plate attached to said plunger and mounted beneath said bottom in position to frictionally engage said bottom when said solenoid is actuated, circuit means coupling said pressure sensitive switch and said solenoid for causing actuation of said solenoid upon closure of said pressure sensitive switch, said pressure sensitive switch being normally open and being actuated to a closed position responsive to a person stepping on said pad and responsive to loss of fluid pressure in said closed system, whereby said friction plate engages said bottom and holds said housing against rotation when a person steps on said pad and when there is a loss of fluid pressure in said closed system.

References Cited in the file of this patent

UNITED STATES PATENTS

| | | |
|---|---|---|
| 439,376 | Blanchard | Oct. 28, 1890 |
| 1,171,346 | Rose | Feb. 8, 1916 |
| 3,078,522 | Anderson | Feb. 26, 1963 |

FOREIGN PATENTS

| | | |
|---|---|---|
| 167,321 | Germany | Jan. 29, 1906 |